United States Patent Office 3,331,781
Patented July 18, 1967

---

3,331,781
AMPHOTERIC SURFACE-ACTIVE AGENTS AND METHOD OF PREPARING THEM
Gregoire Kalopissis and Andre Viout, Paris, France, assignors to L'Oreal, Paris, France
No Drawing. Filed June 21, 1965, Ser. No. 465,757
Claims priority, application France, Feb. 15, 1962, 888,177, Patent 1,344,212
12 Claims. (Cl. 252—152)

This application is a continuation-in-part of applicants' copending application Ser. No. 256,142, filed Feb. 4, 1963 (now abandoned).

This invention relates to a new product comprising new amphoteric chemical compositions and a process for preparing these compositions.

It has been found that the new compositions according to the invention comprise very valuable surface-active agents which may be used either alone or mixed with other cationic, anionic or non-ionic surface active agents, in many different fields, and particularly for shampooing the hair and in the preparation of hair dyeing solutions.

Their use in shampooing is the more attractive because they offer the valuable advantage of being very well tolerated by the mucous membrane of the eye.

The new surface active compositions according to the invention may be considered as derivatives of asparagine and are characterized by the following general formula:

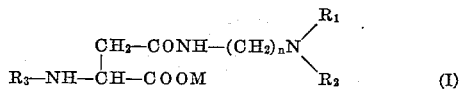

in which $R_1$ and $R_2$ are identical or different lower alkyls which may comprise up to 4 carbon atoms, $R_1$ and $R_2$ may also form part of a heterocyclic, $n$ is an integer having a value of 2 to 5 and preferably 2 or 3, $R_3$ designates an aliphatic hydrocarbon residue comprising 10–18 carbon atoms, and M designates hydrogen, sodium, potassium or ammonium.

The process of preparing the new surface-active compositions according to the invention consists in condensing maleic anhydride with an alkylene-diamine having the following general formula:

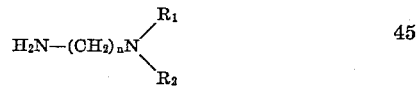

in which $n$, $R_1$ and $R_2$ have the significances indicated in the above Formula I, then, after salification, treating the maleamic acid derivative thus obtained, which has the formula:

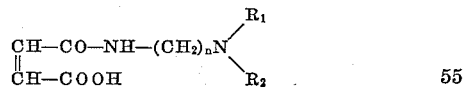

in which $n$, $R_1$ and $R_2$ also have the significances previously assigned, with a primary fatty amine having the following formula:

in which $R_3$ has the above-mentioned significance, thus obtaining the composition of Formula I.

As an example of particularly suitable alkylene diamines the following may be mentioned:

N,N-dimethyl- or N,N-diethylethylenediamines
N,N-dimethyl- or N,N-diethyl- or N,N-dipropylpropylene-diamines
N-($\beta$-amino-ethyl)-morpholine
N-($\beta$-aminopropylpiperidine)

The following may, of course, also be used:

N,N-dimethyl- or N,N-diethylbutylenediamines
N,N-dimethyl- or N,N-diethylpentamethylenediamines.

As examples of particularly suitable fatty amines the following may be cited: decylamine, dodecylamine, the amines derived from the fatty acids of copra or tallow or mixtures thereof preferably within the molecular ratio of 2:1, etc. . . . . .

The fatty residue may comprise a mixture of fatty acid chains derived from the fatty acid of copra and the fatty acids of tallow, the tallow derivative comprising from 0% to about 30% of said mixture.

The new amphoteric chemical compositions according to the invention may be used in aqueous solutions at acid, neutral or alkaline pH values. In the first case they act as cationic surface active agents; in the last case, as anionic surface active agents.

The invention thus also envisages, as a new article of manufacture, a surface active composition characterized by the fact that it contains a composition having the general Formula I as given above.

The new composition according to the invention may naturally comprise other known cationic, anionic, or non-ionic surface active agents. It is particularly valuable for use in shampooing the hair.

We have moreover found, and this was entirely unforeseeable, that aqueous solutions of the compositions of Formula I are remarkably innocuous to the mucous membrane of the eye.

This harmlessness has been established by many tests made by applicant and these tests are summarized in the following tables:

TABLE I

Application of a solution of:

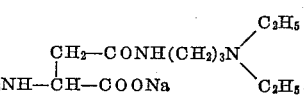

at a concentration of 0.1M (molecular weight—452).

| pH | Rabbits | Observation 24 hrs. after application | Observation 7 days after application |
|---|---|---|---|
| pH 3 | No. 1 | 3+ | Recovered. |
|  | No. 2 | 3 | Do. |
|  | No. 3 | 3++ | Do. |
|  | No. 4 | 2+ | Do. |
| pH 7 | No. 1 | ¹3 | Do. |
|  | No. 2 | 2 | Do. |
|  | No. 3 | 2+ | Do. |
|  | No. 4 | 2 | Do. |
| pH 8 | No. 1 | 2+ | Do. |
|  | No. 2 | 2 | Do. |
|  | No. 3 | 2 | Do. |
|  | No. 4 | ¹2 | Do. |

¹ Weak.

TABLE II

Application of a solution of:

$$\begin{array}{c} \text{CH}_2\text{—CO—NH(CH}_2)_2\text{N} \diagdown \begin{array}{c} \text{C}_2\text{H}_5 \\ \text{C}_2\text{H}_5 \end{array} \\ | \\ \text{RNH—CH—COONa} \end{array}$$

at a concentration of 0.1M (molecular weight—449) R=copra.

| pH | Rabbits | Observation 24 hrs. after application | Observation 7 days after application |
|---|---|---|---|
| pH 3 | No. 1 | 2+ | Recovered. |
|  | No. 2 | 2+ | Do. |
|  | No. 3 | 2+ | Do. |
|  | No. 4 | 2+ | Do. |
| pH 7 | No. 1 | 2 | Do. |
|  | No. 2 | 2 | Do. |
|  | No. 3 | 2 | Do. |
|  | No. 4 | 2 | Do. |
| pH 8 | No. 1 | 2 | Do. |
|  | No. 2 | 2 | Do. |
|  | No. 3 | 2 | Do. |
|  | No. 4 | [1]2 | Do. |

[1] Weak.

TABLE III

Application of a solution of:

$$\begin{array}{c} \text{CH}_2\text{CONH(CH}_2)_2\text{N} \diagdown \begin{array}{c} \text{C}_2\text{H}_5 \\ \text{C}_2\text{H}_5 \end{array} \\ | \\ \text{RNH—CH—COONa} \end{array}$$

at a concentration of 0.1M (molecular weight—505) R=tallow.

| pH | Rabbits | Observation 24 hrs. after application | Observation 7 days after application |
|---|---|---|---|
| pH 3 | No. 1 | 2+ | Recovered. |
|  | No. 2 | 2 | Do. |
|  | No. 3 | 2+ | Do. |
|  | No. 4 | 2++ | Do. |
| pH 7 | No. 1 | 2++ | Do. |
|  | No. 2 | 2++ | Do. |
|  | No. 3 | 2 | Do. |
|  | No. 4 | Nothing | |
| pH 8 | No. 1 | 3++ | Do. |
|  | No. 2 | [1]2 | Do. |
|  | No. 3 | 2++ | Do. |
|  | No. 4 | 2 | Do. |

[1] Weak.

By way of contrast, the following table shows the effect of the introduction of a conventional surface-active agent into the eyes of rabbits:

TABLE IV

Application of a solution of cetyltrimethylammonium bromide in a concentration of 0.1 M pH=3.5

| Rabbits | Observation 24 hrs. after application | Observation 7 days after application |
|---|---|---|
| No. 1 | 5 ++ (a) | Healed. |
| No. 2 | 5 +++ (b) | Healed—cornea less shiny. |
| No. 3 | 5 ++ (b) | Eyelid deformed—opaque cornea. |
| No. 4 | 2 +++ (b) | Partially opaque cornea. |

The symbols employed in these tables have the following significances:

1=irritation of the bulbar or palpebral conjunctiva
2=irritation of the bulbar and palpebral conjunctiva
3=2 plus watering of the eyes (curable)
4=3 plus non-purulent secretion (curable)
5=4 plus purulent secretion—closing of the eyelids, cornea roughened with possible loss of sensitivity. (Recovery slow, but possible.)
6=5 plus damage to the palpebral edges and even the skin.

The numerals 1–6 may be followed by from 1 to 5 crosses according to the acuteness of the effect.

The corneal lesions being of two types, the numbers corresponding to the most serious damage may also be followed by:
(a) which corresponds to a loss of brilliance (cornea roughened)
(b) which corresponds to the more or less complete destruction of the corneal epithelium with more or less extensive ulceration and loss of corneal sensitivity.

The cornea may be attacked in cases 5 and 6 either by the product itself or by the pathological conjunctival secretion caused by the product.

The loss of corneal sensitivity facilitates ulceration.

The tests summarized in the foregoing tables clearly show that products according to the invention do not attack the cornea, as is frequently the case with cationic, anionic, or nonionic products.

The new compositions according to the invention which have valuable surface active properties may be used in various fields and especially in the cosmetic field.

They are particularly valuable for the preparation of shampoos having excellent foaming and detergent properties. Their application to hair renders it supple and easy to comb. Moreover hair which has been shampooed with them does not have an accumulated electrostatic charge after drying.

The following examples illustrate ways of preparing the new chemical compositions according to the invention.

EXAMPLES OF THE PREPARATION OF NEW COMPOSITIONS

Example 1

Preparation of the sodium salt of N-(N',N'-diethylaminopropyl)-N²-dodecyl-asparagine having the following formula:

$$\begin{array}{c} \text{CH}_2\text{—CONH(CH}_2)_3\text{N} \diagdown \begin{array}{c} \text{C}_2\text{H}_5 \\ \text{C}_2\text{H}_5 \end{array} \\ | \\ \text{C}_{12}\text{H}_{25}\text{NH—CH—COONa} \end{array}$$

N-(N',N'-diethylaminopropyl) maleamic acid is first prepared in the manner described in U.S. Patent No. 2,821,521, issued Jan. 28, 1958.

To a solution of 0.2 mol plus a 5% excess of this substituted maleamic acid in 100 cc. of ethanol there is added a stiochiometric quantity of soda dissolved in a minimum of water.

The solution of the sodium salt of N-(N',N'-diethylaminopropyl) maleamic acid thus obtained is added drop by drop, while stirring, to 0.2 mol of dodecylamine.

The mixture is then caused to reflux for six hours. After evaporation of the alcohol a pasty product is obtained which is soluble in water at any pH, and the purity of which, after dosing with amine functions, rises to 93%. A 10% aqueous solution has a pH of 11.2.

Example 2

Preparation of the sodium salt of N-(N',N'-diethylaminopropyl)-N²-alkyl (fatty) asparagine having the following formula:

$$\begin{array}{c} \text{CH}_2\text{—CONH(CH}_2)_3\text{N} \diagdown \begin{array}{c} \text{C}_2\text{H}_5 \\ \text{C}_2\text{H}_5 \end{array} \\ | \\ \text{R—NH—CH—COONa} \end{array}$$

R=alkyl residue derived from the fatty acids of copra.

The procedure is the same as in Example 1, but the primary amines deriving from the fatty acids of copra are used instead of dodecylamine. A product having the following formula and a purity of 95% is thus obtained, in the form of a viscous clear yellow mass, soluble in water at any pH. A 10% aqueous solution has a pH of 11.9.

Example 3

Preparation of the soduim salt of N-(N',N'-diethylaminoethyl)-N²-alkyl (fatty) asparagine having the following formula:

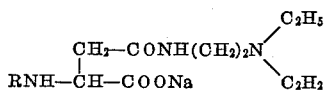

R=alkyl residue derived from the fatty acids of copra.

N-(N',N'-diethylaminoethyl)-maleamic acid is first prepared in the same way as in Example 1 by reacting N,N-diethylaminoethylamine with maleic anhydride. Then the primary amine of the fatty acids of copra is reacted with the sodium salt of this acid. This yields a viscous mass which is soluble in water at any pH, with a purity of 94%. A 10% aqueous solution has a pH of 11.5.

Example 4

Preparation of the sodium salt of N-(N',N'-dimethyl-amino-propyl)-N²-alkyl (fatty) asparagine having the following formula:

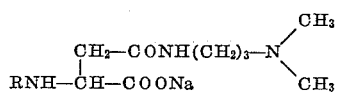

R=alkyl residue derived from the fatty acids of tallow.

Proceeding in the same manner as in the case of Example 1, N-(N',N'-dimethylaminopropyl)-maleamic acid is first prepared in the form of a white solid, having its melting point at 158–159° C. The primary amine derived from the fatty acids of tallow is reacted with the sodium salt of that acid, yielding in the manner already described a thick viscous mass soluble in water at any pH, and having a purity of 92%. A 10% aqueous solution has a pH of 10.6.

Example 5

Preparation of the sodium salt of N-(N',N'-diethylaminopropyl)-N²-decyl asparagine having the formula:

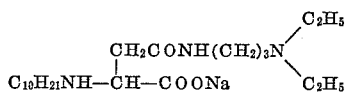

This product is obtained in the same manner as in Example 1, except for using decyl-amine in place of dodecylamine.

This asparagine derivative is obtained in a purity of 96%, in the form of a viscous clear yellow mass, soluble in water at all pH values. A 10% aqueous solution has a pH of 11.1.

Example 6

Preparation of the sodium salt of N-(N',N'-diethylaminoethyl)-N²-alkyl (fatty) asparagine having the formula:

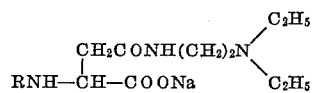

in which R is an alkyl residue derived from the fatty acids of tallow.

This product is obtained by following the procedure hereinbefore described, using N,N-diethyl-ethylene diamine and the fatty amines derived from the fatty acids of tallow. Its purity is 94%. A 10% aqueous solution has a pH of 11.7.

Example 7

Preparation of the sodium salt of N-(N',N'-dimethylaminopropyl)-N²-alkyl (fatty) asparagine, having the formula:

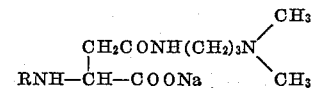

R being an alkyl residue derived from the fatty acids of copra.

Proceeding as in Example 1, but replacing dodecylamine with the primary amine derived from the fatty acids of copra, the above-mentioned asparagine derivative is obtained in a purity of 98%. A 10% aqueous solution has a pH of 11.5.

Example 8

Preparation of the potassium salt of N-(morpholino ethyl) N²-alkyl (fatty) asparagine, having the formula:

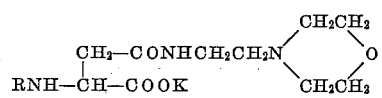

R being an alkyl residue derived from the fatty acids of copra.

N-(morpholino ethyl) maleamic acid is first prepared in the same way as in Example 1, by reacting N-(β-amino ethyl) morpholine with maleic anhydride.

The product is in the form of a white solid having its melting point at 161–162° C.

The primary amines derived from the fatty acids of copra are then reacted with the potassium salt of that acid. The desired product is obtained in a purity of 90%, in the form of a yellow-orange viscous mass, soluble in water at all pH values. A 10% aqueous solution has a pH of 11.6.

Example 9

(a) Preparation of N-(piperidinopropyl)-maleamic acid, having the formula:

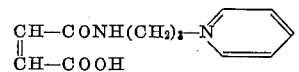

To 14.2 g. (0.1 mole) of N-(β-aminopropyl)piperidine dissolved in 100 g. of ethyl alcohol, 10 g. of pulverized maleic anhydride is added over a period of 30 minutes with agitation, maintaining the temperature between 6 and 8° C.

After agitation of the mixture for 2 hours at 25° C., the amino nitrogen and the acid are quantatively determined.

The corresponding results were obtained from the dry products:

| | Meq./gram |
|---|---|
| Acidity | 3.87 |
| Amino nitrogen | 4.2 |

(b) Preparation of the sodium salt of N-piperidinopropyl-N²-dodecyl asparagine, having the formula:

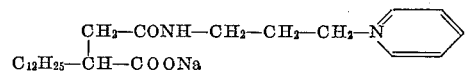

The N-(piperidinopropyl)-maleamic acid obtained in alcoholic solution is neutralized with 11.1 g. of 33.8% sodium hydroxide solution after which 17.5 g. of dodecylamine are added. The mixture is then heated at 65° C. for 5 hours, and concentrated by the evaporation from the solution of 60 g. of alcohol, the temperature being maintained at 65° C. for another 3 hours. The alcohol and the water are removed under vacuum; a pasty product is obtained, which is soluble in water.

While the foregoing examples disclose a pH range of 4 to 8.6 in the shampooing compositions, and while this is the preferred range for the pH of these compositions when utilized as shampoos, any pH between 4 and 11.9 may be used.

EXAMPLES OF THE APPLICATION OF THE NEW COMPOSITIONS IN SHAMPOOING HAIR

Example 1A

A solution is prepared which contains:

| | |
|---|---|
| Sodium salt of N-(N',N'-diethyl amino propyl)-N$^2$-dodecyl asparagine _____ g__ | 10 |
| Lactic acid in a quantity sufficient to bring the pH value to 4. | |
| Water, q.s.p. _____ cc__ | 100 |

This solution gives a foamy shampoo and permits the hair to be easily combed.

Example 2A

The following solution is prepared:

| | |
|---|---|
| Sodium salt of N-(N',N'-diethyl amino propyl)-N$^2$-dodecyl asparagine _____ g__ | 7.5 |
| Sodium salt of N-(N',N'-diethyl amino ethyl)-N$^2$-alkyl (tallow) asparagine _____ g__ | 2.5 |
| Sufficient lactic acid to bring the solution to pH 6. | |
| Water, q.s.p. _____ cc__ | 100 |

This yields an excellent foaming shampoo which renders the hair soft and easy to comb. Moreover, hair which has been shampooed with it does not have an accumulated electrostatic charge after drying.

Example 3A

A solution is prepared which contains:

| | |
|---|---|
| Sodium salt of N-(N',N'-diethyl amino propyl)-N$^2$-dodecyl asparagine _____ g__ | 10 |
| Sufficient lactic acid to bring to a pH of 7.5. | |
| Sufficient water to bring to a total of _____ cc__ | 100 |

This yields an excellent foaming shampoo which renders the hair soft and easy to comb.

Example 4A

An aqueous solution is prepared which contains the following:

| | |
|---|---|
| Sodium salt of N-(N',N'-diethyl amino propyl)-N$^2$-dodecyl asparagine _____ g__ | 4 |
| Lauryl alcohol condensed with 10 mols of ethylene oxide per mol of alcohol _____ g__ | 8 |
| Sufficient lactic acid to bring to pH 4. | |
| Sufficient water to bring to _____ cc__ | 100 |

The shampoo thus obtained foams well and imparts great softness to the washed hair.

Example 5A

An aqueous solution is prepared which contains the following:

| | |
|---|---|
| Sodium salt of N-(N',N'-diethyl amino propyl)-N$^2$-dodecyl asparagine _____ g__ | 4 |
| Sodium salt of N-(N',N'-dimethyl amino propyl)-N$^2$-alkyl (tallow) asparagine _____ g__ | 2 |
| Nonyl phenol condensed with 12 mols of ethylene oxide per mol of nonyl phenol _____ g__ | 8 |
| Sufficient lactic acid to bring to pH 6. | |
| Sufficient water to bring to _____ cc__ | 100 |

This shampoo foams well and imparts great softness to the washed hair.

Example 6A

An aqueous solution is prepared which contains the following:

| | |
|---|---|
| Sodium salt of N-(N',N'-diethyl amino propyl)-N$^2$-dodecyl asparagine _____ g__ | 1.1 |
| 100% technical ammonium lauryl sulfate _____ g__ | 9 |
| Lauryl hydroxy ethyl amide _____ g__ | 0.8 |
| Sufficient lactic acid to bring to pH 7. | |
| Sufficient water to bring to _____ cc__ | 100 |

This solution constitutes shampoo which is an effective detergent, foams well, and imparts great softness to the washed hair.

Example 7A

An aqueous solution is prepared which contains:

| | |
|---|---|
| Sodium salt of N-(N',N'-dimethyl amino propyl)-N$^2$-alkyl (tallow) asparagine _____ g__ | 0.5 |
| 100% technical ammonium lauryl sulfate _____ g__ | 12 |
| Oleic acid _____ g__ | 0.2 |
| Lauryl dihydroxy ethyl amide _____ g__ | 2 |
| Sufficient lactic acid to bring to a pH of 6.5. | |
| Sufficient water to bring to _____ cc__ | 100 |

This viscous shampoo is a good detergent and foams well. It imparts great softness to the hair which is washed with it.

Example 8A

An aqueous solution is prepared which contains:

| | |
|---|---|
| Potassium salt of N-(morpholino-ethyl)-N$^2$ - alkyl (fatty) asparagine _____ g__ | 7 |
| Sufficient lactic acid to bring to a pH of 7.5. | |
| Sufficient water to make _____ cc__ | 100 |

This solution constitutes an excellent shampoo which is an effective detergent, foams well and imparts great softness to the washed hair.

Example 9A

An aqueous solution is prepared which contains:

| | |
|---|---|
| Ammonium salt of N - (N',N' - diethyl aminopropyl)-N$^2$-alkyl (fatty) asparagine wherein the fatty residues are constituted by ⅔ of the fatty chain deriving from the fatty acids of copra and by ⅓ of the fatty chain deriving from the fatty acids of tallow _____ g__ | 10 |
| Sufficient water to make _____ cc__ | 100 |
| Sufficient lactic acid to bring to a pH of 8.6. | |

This solution constitutes a shampoo having good foaming and detergent properties. It makes the hair supple and easy to comb.

Example 10A

An aqueous solution is prepared which contains:

| | |
|---|---|
| Sodium salt of N-(N',N'-diethyl aminopropyl)-N$^2$-alkyl (fatty) asparagine wherein the fatty residues are constituted by ⅔ of the fatty chain deriving from the fatty acids of copra and by ⅓ of the fatty chain deriving from fatty acids of tallow _____ g__ | 10 |
| Sufficient lactic acid to bring to a pH of 8.5. | |
| Sufficient water to make _____ cc__ | 100 |

This yields an excellent foaming shampoo which renders the hair soft and easy to comb.

Example 11A

An aqueous solution is prepared which contains:

| | |
|---|---|
| The sodium salt of N-piperidinopropyl-N-dodecyl asparagine _____ g__ | 7 |
| Lactic acid, q.s.p. (pH 7.5). | |
| Water, q.s.p. _____ cc__ | 100 |

This solution constitutes an excellent shampoo, which has good detergent and foaming properties, and gives the hair a brilliant sheen.

While in the above examples the shampooing compositions have been adjusted to have a pH of 4 to approximately 8.6 by the addition of lactic acid, other acids may be used, and a higher pH may also be used.

Example 12A

A solution is prepared which contains:

Sodium salt of N-(N',N'-diethyl amino propyl)-
  N²-dodecyl asparagine _____ g__ 10
Hydrochloric acid in a quantity sufficient to bring the
  pH value to 4.
Water, q.s.p. _____ cc__ 100

This solution gives a foamy shampoo and permits the hair to be easily combed.

Example 13A

A solution is prepared which contains:

Sodium salt of N-(N',N'-diethyl amino propyl)-
  N²-dodecyl asparagine _____ g__ 9
Acetic acid in a quantity sufficient to bring the pH
  value to 5.
Water, q.s.p. _____ cc__ 100

This solution gives a foamy shampoo and permits the hair to be easily combed.

Example 14A

The following solution is prepared:

Sodium salt of N-(N',N'-diethyl amino propyl)-
  N²-dodecyl asparagine _____ g__ 7.5
Sodium salt of N-(N',N'-diethyl amino ethyl)-N²-
  alkyl (tallow) asparagine _____ g__ 2.5
Sufficient phosphoric acid to bring the solution to
  pH 6.
Water, q.s.p. _____ cc__ 100

This solution constitutes a shampoo having foaming and detergent properties and making the hair supple and easy to comb.

Moreover, hair which has been shampooed with it does not have an accumulated electrostatic charge after drying.

Example 15A

The following solution is prepared:

Sodium salt of N-(N',N'-diethyl amino propyl)-N²-
  dodecyl asparagine _____ g__ 8
Sodium salt of N-(N',N'-diethyl amino ethyl)-N²-
  alkyl (tallow) asparagine _____ g__ 2
Sufficient formic acid to bring the solution to pH 6.
Water, q.s.p. _____ cc__ 100

This solution constitutes a shampoo having foaming and detergent properties and making the hair supple and easy to comb.

Moreover, hair which has been shampooed with it does not have an accumulated electrostatic charge after drying.

Example 16A

A solution is prepared which contains:

Sodium salt of N-(N',N'-diethyl amino propyl)-N²-
  dodecyl asparagine _____ g__ 10
Sufficient tartic acid to bring the solution to a pH 7.5.
Water, q.s.p. _____ cc__ 100

This yields an excellent foaming shampoo which renders the hair soft and easy to comb.

Example 17A

A solution is prepared which contains:

Sodium salt of N-(N',N'-diethyl amino propyl)-N²-
  dodecyl asparagine _____ g__ 10
Sufficient citric acid to bring the solution to a pH 7.5.
Sufficient water to bring to _____ cc__ 100

This yields an excellent foaming shampoo which renders the hair soft and easy to comb.

Example 18A

An aqueous solution is prepared which contains the following:

Sodium salt of N-(N',N'-diethyl amino propyl)-N²-
  dodecyl asparagine _____ g__ 4
Lauryl alcohol condensed with 10 mols of ethylene
  oxide per mol of alcohol _____ g__ 8
Sufficient acetic acid to bring the solution to a pH 5.
Sufficient water to bring to _____ cc__ 100

The shampoo thus obtained foams well and imparts great softness to the washed hair.

Example 19A

An aqueous solution is prepared which contains the following:

Sodium salt of N-(N',N'-diethyl amino propyl)-N²-
  dodecyl asparagine _____ g__ 4
Sodium salt of N-(N',N'-dimethyl amino propyl)-
  N²-alkyl (tallow) asparagine _____ g__ 2
Nonyl phenol condensed with 12 mols of ethylene
  oxide per mol of nonyl phenol _____ g__ 8
Sufficient citric acid to bring the solution to a pH 6.
Sufficient water to bring to _____ cc__ 100

This shampoo foams well and imparts great softness to the washed hair.

Example 20A

An aqueous solution is prepared which contains the following:

Sodium salt of N-(N',N'-diethyl amino propyl)-N²-
  dodecyl asparagine _____ g__ 1.1
100% technical ammonium lauryl sulfate ____ g__ 9
Lauryl hydroxy ethylamide _____ g__ 0.8
Sufficient hydrochloric acid to bring the solution to
  a pH 7.
Water, q.s.p. _____ cc__ 100

This solution constitutes shampoo which is an effective detergent, foams well and imparts great softness to the washed hair.

Example 21A

An aqueous solution is prepared which contains:

Potassium salt of N-(morpholino-ethyl)-N²-alkyl
  (fatty) asparagine _____ g__ 7
Sufficient citric acid to bring to a pH of 7.5.
Sufficient water to make _____ cc__ 100

This solution constitutes an excellent shampoo which is an effective detergent, foams well and imparts great softness to the washed hair.

EXAMPLES OF THE APPLICATION OF THE NEW COMPOSITIONS IN DYEING HAIR

Example 1B

A hair-dyeing composition is prepared, which contains the following:

Sodium salt of N-(N'N'-diethylaminopropyl)-N²-
  dodecyl asparagine _____ g__ 4
Nonyl phenol+4 mol. ethylene oxide _____ g__ 20
Nonyl phenol+8.75 mol. ethylene oxide _____ g__ 20
Diethylene glycol _____ g__ 17
Ethyl alcohol _____ g__ 3
Ammonia at 22° Bé. _____ ml__ 12
Paratoluylene diamine _____ g__ 0.6
Metadiaminoanisol sulfate _____ g__ 0.15
Resorcine _____ g__ 0.5
Paraaminophenol _____ g__ 0.4
Metaaminophenol _____ g__ 0.1
Water, q.s.p. _____ cc__ 100

This solution is diluted weight by weight with hydrogen peroxide to 20 volumes. The final pH is 9.9.
The shade of dyeing which is obtained is chestnut.

Example 2B

A hair dyeing solution is prepared which contains:

| | |
|---|---:|
| Sodium salt of N-(N'N'-diethylaminopropyl)-N²-dodecyl asparagine _____ g__ | 3 |
| Sodium salt of N-(N'N'-diethylaminoethyl)-N²-alkyl (tallow) asparagine _____ g__ | 1 |
| Nonyl phenol+4 mol. ethylene oxide _____ g__ | 20 |
| Nonyl phenol+8.75 mol. ethylene oxide _____ g__ | 20 |
| Diethylene glycol _____ g__ | 17 |
| Ethyl alcohol _____ g__ | 3 |
| Ammonia at 22° Bé. _____ ml__ | 12 |
| Paratoluylene diamine _____ g__ | 0.2 |
| Metadiaminoanisol sulfate _____ g__ | 0.01 |
| Resorcine _____ g__ | 0.1 |
| p-Aminophenol _____ g__ | 0.3 |
| m-Aminophenol _____ g__ | 0.05 |
| Water, q.s.p. _____ cc__ | 100 |

This solution is diluted weight for weight with hydrogen peroxide to 20 volumes. The final pH is 9.7.
The shade of dyeing obtained is blonde.

Example 3B

A hair dyeing solution is prepared which contains the following:

| | |
|---|---:|
| Potassium salt of N-(morpholino-ethyl)-N²-alkyl (fatty) asparagine _____ g__ | 4 |
| Nonyl phenol+4 mol. ethylene oxide _____ g__ | 20 |
| Nonyl phenol+8.75 mol. ethylene oxide _____ g__ | 20 |
| Diethylene glycol _____ g__ | 17 |
| Ethyl alcohol _____ g__ | 3 |
| Ammonia at 22° Bé. _____ ml__ | 12 |
| Paratoluylene diamine _____ g__ | 0.6 |
| Metadiaminoanisol sulfate _____ g__ | 0.025 |
| Resorcine _____ g__ | 0.2 |
| p-Aminophenol _____ g__ | 1 |
| m-Aminophenol _____ g__ | 0.1 |
| Water, q.s.p. _____ cc__ | 100 |

This solution is diluted weight for weight with hydrogen peroxide to 20 volumes. The final pH is 10.
The shade of dyeing obtained is golden chestnut.

Example 4B

A hair dyeing solution is prepared which contains:

| | |
|---|---:|
| Ammonium salt of N-(N'N'-diethylamino-propyl)-N²-alkyl (fatty) asparagine, in which the fatty residues are composed of ⅔ of the fatty chain portion of the fatty acids of copra and ⅓ of the fatty chain portion of the fatty acids of tallow g__ | 4 |
| Nonyl phenol+4 mol. ethylene oxide _____ g__ | 20 |
| Nonyl phenol+8.75 mol. ethylene oxide _____ g__ | 20 |
| Diethylene glycol _____ g__ | 17 |
| Ethyl alcohol _____ g__ | 3 |
| Ammonia at 22° Bé. _____ ml__ | 12 |
| Paratoluylene diamine _____ g__ | 0.6 |
| Metadiaminoanisol sulfate _____ g__ | 0.15 |
| Resorcine _____ g__ | 0.5 |
| p-Aminophenol _____ g__ | 0.4 |
| m-Aminophenol _____ g__ | 0.1 |
| Water, q.s.p. _____ cc__ | 100 |

This solution is diluted weight for weight with hydrogen peroxide to 20 volumes. The final pH is 9.5.
The shade of dyeing obtained is chestnut brown.

Example 5B

The following composition is prepared:

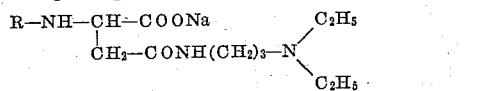

| | G. |
|---|---:|
| (wherein R is a copra group (100%)) _____ | 5 |
| Nonyl phenol 4 mol. ethylene oxide _____ | 250 |
| Nonyl phenol 9 mol. ethylene oxide _____ | 250 |
| Ethyl alcohol at 96° Bé. _____ | 150 |
| Ammonia (20% solution) to bring pH to 9. | |
| Paratoluylenediamine _____ | 5.5 |
| Metadiaminoanisol sulfate _____ | 0.15 |
| Resorcine _____ | 3 |
| p-Aminophenol _____ | 0.5 |
| m-Aminophenol _____ | 0.75 |
| Water, q.s.p. _____ | 1000 |

This solution is mixed with an equal volume of hydrogen peroxide and applied in the usual manner to the hair. The shade imparted to the hair is chestnut brown.

Example 6B

The following solution is prepared:

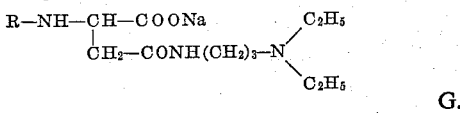

| | G. |
|---|---:|
| (wherein R is 80% copra residue and 20% tallow residue) _____ | 2 |
| Oxyethylene lauryl alcohol, with 15 to 20 mol. of ethylene oxide _____ | 3 |
| Diethanolamide of coca _____ | 2 |
| p-Nitrophenylene diamine _____ | 0.5 |
| Citric acid (40% solution) to bring to a pH of 8. | |
| Water, q.s.p. _____ | 100 |

This solution is applied in the usual manner to the hair, and gives a mahogany shade on the hair.

Example 7

The following composition is prepared:

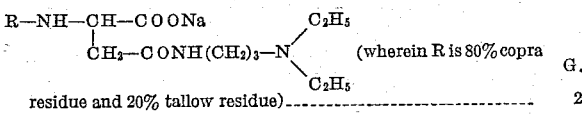

| | G. |
|---|---:|
| (wherein R is 80% copra residue and 20% tallow residue) _____ | 2 |
| Oxyethylene lauryl alcohol, with 15 to 20 molecules of ethylene oxide _____ | 3 |
| Diethanolamide of coco _____ | 2 |
| p-Nitrophenylenediamine _____ | 0.5 |
| Methyl violet _____ | 0.1 |
| Citric acid (40% solution) to bring pH to 5. | |
| Water, q.s.p. _____ | 100 |

The solution is applied to the hair in the usual manner, and gives the hair a violine color.

While the foregoing examples disclose a pH range of 5 to 10 in the dyeing compositions, and while the preferred range for the pH of these solutions when utilized as hair dyes is between 9 and 10, any pH between about 4 and about 11.9 may be used.

What is claimed is:

1. A detergent composition consisting essentially of a water solution containing 0.5% to 10% by weight of at least one substance having the formula:

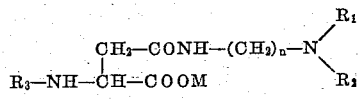

in which

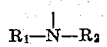

is selected from the group consisting of lower di alkyl amines each having up to four carbon atoms, a morpholine group and a piperidine group, $n$ is an integer having a value of between 2 and 5 inclusive, $R_3$ is an aliphatic hydrocarbon containing 10 to 18 carbon atoms, and M is a substance selected from the group consisting of sodium, hydrogen, potassium and ammonium, together with sufficient acid compatible with the skin and the mucous membrane to bring the pH of the detergent composition to between 4 and 11.9.

2. An aqueous solution of a detergent composition as claimed in claim 1, wherein the substance is the sodium salt of N-(N',N'-diethylamino propyl)-$N^2$-dodecyl asparagine, the pH of the solution being adjusted to between about 4 and 7.5.

3. A detergent composition as set forth in claim 1, wherein the substance is a mixture of sodium salts of N-(N',N'-diethylamino propyl)-$N^2$-dodecyl asparagine and N-(N',N'-diethylamino ethyl)-$N^2$-tallow alkyl asparagine, the pH of the solution being adjusted to about 6.

4. A detergent composition as claimed in claim 2, further containing about 8% by weight of lauryl alcohol condensed with 10 moles of ethylene oxide per mole of alcohol, the pH of the solution being adjusted to 4.

5. A detergent composition as set forth in claim 1, wherein the substance is a mixture of sodium salts of N-(N',N'-diethylamino propyl)-$N^2$-dodecyl asparagine and N-(N',N'-diethylamino propyl)-$N^2$-tallow alkyl asparagine, and about 8% by weight of a condensation product of nonylphenol with 12 moles of ethylene oxide per mole of nonylphenol, the pH of the solution being adjusted to 6.

6. An aqueous solution of a deteregnt composition as claimed in claim 2, further characterized by the fact that the solution contains 9% by weight ammonium lauryl sulfate and 0.8% by weight lauryl hydroxy ethyl amide, the solution having a pH of 7.

7. An aqueous solution of a detergent composition consisting essentially of about 7% by weight of the sodium salt of N-(N',N'-dimethylamino propyl)-$N^2$-tallow alkyl asparagine, 12% by weight ammonium lauryl sulfate, 0.2% by weight oleic acid, and 2% by weight lauryl dihydroxyethyl amide, the pH of the solution being adjusted to about 5.5.

8. An aqueous solution of a detergent composition consisting essentially of about 7% by weight of the potassium salt of N-(morpholinoethyl)-$N^2$-fatty tallow alkyl asparagine, the pH of the solution being adjusted to about 7.5.

9. An aqueous solution of a detergent composition consisting essentially of about 10% by weight of the sodium salt of N-(N'-N'-diethylamino propyl)-$N^2$-fatty alkyl asparagine, wherein the fatty residues comprise a mixture of fatty chains derived from the fatty acids of copra and the fatty acids of tallow in a molecular ratio of about 2:1 of copra derivative to tallow derivative, the pH of the solution being adjusted to about 8.5.

10. A detergent composition as claimed in claim 1 wherein the substance is the ammonium salt of N-(N',N'-diethylamino propyl)-$N^2$-fatty alkyl asparagine, wherein the fatty residues comprise a mixture of the fatty chains derived from the fatty acids of copra and the fatty acids of tallow, in a molecular ratio of about 2:1 of the copra derivative to the tallow derivative, the pH of the solution being adjusted to about 8.6.

11. A detergent composition as claimed in claim 1, wherein the substance is the sodium salt of N-piperidinopropyl-$N^2$-dodecyl asparagine, the pH of the solution being adjusted to about 7.5.

12. A detergent composition as claimed in claim 1, wherein the substance is the sodium salt of N-(N',N'-diethylamino propyl)-$N^2$-fatty alkyl asparagine, wherein the fatty residues comprise a mixture of fatty chains derived from the fatty acids of copra and the fatty acids of tallow, the tallow derivative comprising from 0% to about 30% of said mixture, and the remainder of said mixture being comprised of said copra derivative.

References Cited
UNITED STATES PATENTS

| | | | |
|---|---|---|---|
| 3,086,943 | 4/1963 | Lang | 252—152 |
| 3,156,656 | 11/1964 | Libby | 252—152 |
| 3,194,735 | 7/1965 | Brechner | 167—88 |
| 3,200,040 | 8/1965 | Lange | 167—88 |

LEON D. ROSDOL, *Primary Examiner.*

A. T. MEYERS, S. C. DARDEN, *Assistant Examiners.*